(12) United States Patent
Cutlip et al.

(10) Patent No.: US 8,944,014 B2
(45) Date of Patent: Feb. 3, 2015

(54) SYSTEM AND METHOD FOR CONTROL OF A GAS

(75) Inventors: H. David Cutlip, Salem, WV (US);
Gary W. Disbennett, Philippi, WV (US)

(73) Assignee: KSD Enterprises, LLC, Clarksburg, WV (US)

( * ) Notice: Subject to any disclaimer, the term of this patent is extended or adjusted under 35 U.S.C. 154(b) by 296 days.

(21) Appl. No.: 11/777,269

(22) Filed: Jul. 12, 2007

(65) Prior Publication Data
US 2008/0011248 A1 Jan. 17, 2008

Related U.S. Application Data

(60) Provisional application No. 60/830,163, filed on Jul. 12, 2006.

(51) Int. Cl.
*F02M 21/02* (2006.01)
*F02D 19/02* (2006.01)
*E21F 7/00* (2006.01)
*F02D 41/00* (2006.01)
*G07C 5/08* (2006.01)

(52) U.S. Cl.
CPC ............ *F02M 21/0227* (2013.01); *E21F 7/00* (2013.01); *F02M 21/0215* (2013.01); *F02D 19/027* (2013.01); *F02D 19/029* (2013.01); *F02D 41/0027* (2013.01); *G07C 5/085* (2013.01); *Y02T 10/32* (2013.01)
USPC ............. 123/3; 123/527; 210/416.1; 210/739

(58) Field of Classification Search
CPC .......................................... Y02C 20/00–20/30
USPC ............ 701/99, 102, 100, 108, 109; 123/1 A, 123/27 GE, 295, 672, 352, 527, 1 R, 3; 60/39.281, 274; 315/134
See application file for complete search history.

(56) References Cited

U.S. PATENT DOCUMENTS

| | | | |
|---|---|---|---|
| 2,885,555 A * | 5/1959 | Blumer .......................... | 250/379 |
| 4,443,156 A * | 4/1984 | Dunnam, Jr. ..................... | 417/12 |
| 4,576,005 A | 3/1986 | Force | |
| 4,750,454 A | 6/1988 | Santina et al. | |
| 5,070,850 A | 12/1991 | Davis et al. | |
| 5,101,799 A | 4/1992 | Davis et al. | |
| 5,311,851 A * | 5/1994 | Wright, Jr. .................... | 123/630 |
| 5,501,185 A | 3/1996 | King et al. | |
| 5,611,316 A * | 3/1997 | Oshima et al. ................ | 123/494 |
| 5,626,122 A * | 5/1997 | Azuma .......................... | 123/685 |
| 5,703,777 A * | 12/1997 | Buchhop et al. .............. | 701/109 |
| 5,724,948 A | 3/1998 | King et al. | |
| 5,775,308 A | 7/1998 | Headley | |
| 6,189,523 B1 * | 2/2001 | Weisbrod et al. ............. | 123/672 |

(Continued)

*Primary Examiner* — Lindsay Low
*Assistant Examiner* — Kevin Lathers
(74) *Attorney, Agent, or Firm* — Baker & Hostetler LLP

(57) ABSTRACT

The gas control system removes gas from a borehole by generating and collecting an air stream from the borehole using a blower, collecting the gas contained in the air stream using a fuel collector, removing moisture from the gas using a heated dryer, and transporting the gas from the heated dryer to an engine that is at least partially fueled by the gas. The gas control system can include one or more sensors that provide data associated with operating conditions of the gas control system. The sensor data is provided to a manager component, and can be used to evaluate system performance, determine consumption of greenhouse gases and optimize system operations.

17 Claims, 10 Drawing Sheets

(56) References Cited

U.S. PATENT DOCUMENTS

| | | |
|---|---|---|
| 6,205,957 B1 | 3/2001 | Saylor |
| 6,340,005 B1 * | 1/2002 | Keast et al. ............... 123/27 GE |
| 6,378,511 B1 | 4/2002 | Wolters et al. |
| 6,397,790 B1 | 6/2002 | Collier, Jr. |
| 6,578,559 B2 * | 6/2003 | Kilmer ......................... 123/527 |
| 7,246,002 B2 * | 7/2007 | Healy et al. .................. 701/100 |
| 7,533,634 B2 * | 5/2009 | Ritter et al. ............. 123/27 GE |

* cited by examiner

SYSTEM AND METHOD FOR CONTROL OF A GAS

CROSS-REFERENCE TO RELATED APPLICATIONS

This application claims the benefit of U.S. provisional Application Ser. No. 60/830,163, entitled, "Methane Gas Control System", filed on Jul. 12, 2006.

BRIEF DESCRIPTION OF THE DRAWINGS

The claimed subject matter is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The embodiments are described in relation to removing methane from mines, and more specifically coal mines, for convenience purposes only. It would be readily apparent to one having ordinary skill in the art to utilize the system and methods described herein in alternative applications where methane gas or other flammable gas is present at a source, for example, at landfills and dump sites. Therefore, these alternative uses are intended to be within the scope of the subject matter described herein.

Figure 1:
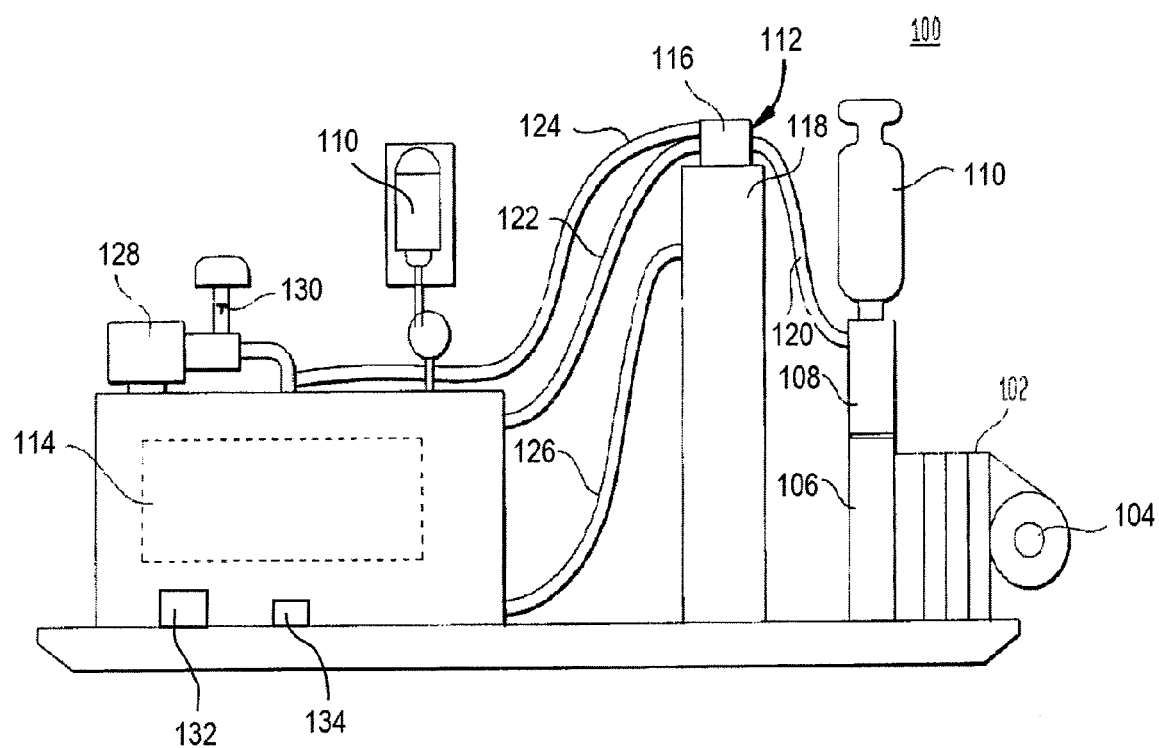
FIG. 1 is a planar back view of a gas control system in accordance with an aspect of the subject matter described herein.
Figure 3:
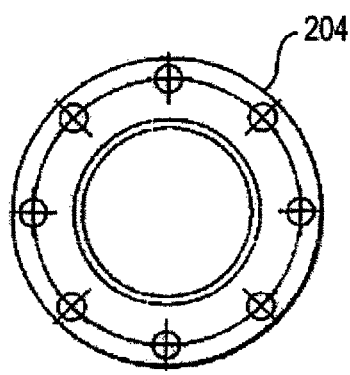
FIG. 3 is a planar top view of the second flange in accordance with an aspect of the subject matter described herein.

FIG. 1 depicts an exemplary gas control system 100. As used herein, the term "exemplary" indicates a sample or example. It is not indicative of preference over other aspects or embodiments. The gas control system 100 can function to remove gas, such as methane or other flammable gases, from a source. In particular, the gas control system 100 can be used to remove methane from boreholes in coal mines, and to regulate the air to fuel ratio of the air stream metered to an internal combustion engine, such as a spark ignition, turbine, or compression ignition engine. As used herein, an engine is used to generally describe internal combustion engines as known to those of ordinary skill in the art. In one embodiment, the gas control system 100 includes a blower 102, which is placed in proximity of a borehole and generates an air stream containing methane or other flammable gas from the borehole. The blower 102 includes an inlet 104 for collecting gas from the air stream, and a discharge section 106 for expelling the air stream from the blower 102. The blower 102 may be a commercially available single stage blower, or a commercially available multi-stage blower. In an embodiment, the blower 102 is a commercially available nine stage 1530 cubic foot per minute (CFM) blower that is run at about 3,550 RPM and capable of about 15 inches of mercury vacuum at the inlet 104. The vacuum at the inlet 104 urges the air stream from the borehole.

A fuel collector 108 is mounted to the discharge section 106 of the blower 102 such that the air stream being expelled from the discharge section 106 passes through the fuel collector 108. The fuel collector 108 collects the gas, including the methane, contained in the air stream generated by the blower 102. The gas control system 100 can include a muffler 110 mounted on top of the fuel collector 108 to reduce the amount of noise generated by operating the gas control system 100.

A heated dryer 112 collects and eliminates moisture from the air stream containing the methane gas and forwards the "dry" methane gas to the engine 114. In yet another embodiment, a portion of the methane gas from the engine 114 is forwarded to an external tap (not depicted) for collection and transmission to external sites. Ideally, the air stream extracted from a borehole contains concentrated methane gas that is very pure, however that is rarely the case as the air stream often contains dilute methane gas along with various contaminants. The heated dryer 112, therefore serves as a mechanism to purify the methane gas in the air stream and improve the quality of the methane gas presented to the engine 114. The heated dryer 112 comprises an inner section 116 and a jacket 118 that surrounds the inner section 116. The inner section 116 is designed to receive the air stream containing the methane gas from the fuel collector 108 via a fuel collector line 120 connected to the fuel collector 108.

The gas control system can include an engine 114 connected to the heated dryer 112 via primary fuel line 122 and secondary fuel line 124, as described in detail below. In addition, engine coolant can be provided to the heated dryer through a coolant line 126. The engine can be at least partially fueled by methane gas collected by the fuel collector 108. In one embodiment, the engine 114 is an engine possessing a carburetor with venturi attached. In yet another embodiment, the engine 114 is a fuel injected engine as known to those of ordinary skill in the art. The engine 114 can include an air cleaner 128 for cleaning atmospheric air before it enters the carburetor, and a special choke 130 mounted in the atmospheric air stream between an air inlet bonnet and the air cleaner 128. The special choke 130 can be manually adjusted by one of ordinary skill in the art by opening or closing a butterfly valve that is locked in place with a thumb screw on a quadrant to regulate the atmospheric air flow into the engine according to the desired air to fuel ratio. In another embodiment, the special choke 130 is operably connected to an actuator whereby the actuator is capable of regulating the flow of atmospheric air into the engine. In still another embodiment, the special choke 130 possesses an integrated actuator that regulates the flow to adjust the flow of atmospheric air through the body of the special choke 130 thereby regulating the flow of atmospheric air into the engine.

The description provided herein describes the operation of a gas control system 100 utilizing an internal combustion engine, which in its various embodiments includes such as a spark ignition engine, a compression ignition engine or a gas turbine. Many of the embodiments described herein are described in terms of a spark combustion engine, however the resulting control goals and actuators 1002 are readily applicable by one of ordinary skill in the art to a gas turbine. In one embodiment of a turbine gas control system 100 an inlet compressor of the gas turbine operates as the blower 102, generating a pressure drop at the borehole that urges the generation of the air stream containing the methane gas. The gas is dried in the heated dryer 112 using the embodiments disclosed herein and fed into compressor and combustion stages as known to those of ordinary skill in the art. In the case of a gas turbine, the heated dryer 112 is heated using engine coolant obtained from a cooling jacket surrounding the gas turbine while the gas from the primary methane gas 124 line is ingested by the turbine compressor, compressed and enter into the combustion stage. In the combustion stage injector nozzles provide augmenting fuel from either the secondary methane gas line 122 potentially augmented with the LP gas system 920. In this manner and others, one of ordinary skill in the art would use a gas turbine engine as the engine 114 in a gas control system 100.

An embodiment of the gas control system 100 includes a manager component 132 adapted to obtain or receive data from one or more sensors 134. Sensors 134 monitor operating conditions of the gas control system 100 and can include engine condition sensors (e.g., oil pressure sensor, coolant temperature sensor, crank angle sensor, manifold air pressure), temperature sensors, air flow sensors, gas content sensors and any other data related to operation of or conditions affecting the gas control system 100, including environmental conditions in the vicinity of the gas control system 100. In one embodiment, the manger component 132 collects data from the sensors 134 and records the data. In another embodiment, the manager component 132 further processes the collected sensor data. In still another embodiment, the manager component 132 also transmits collected sensor data.

When an embodiment of the manager component 132 collects and records sensor data, information regarding operation of the gas control system 100 over time can be used for multiple purposes. Sensor data collected over time can be analyzed to observe trends. For example, the operation of the gas control system 100 or the characteristics of the source of gas are determined from this sensor data. Data can be used to evaluate the effectiveness of the gas control system 100, identify possible problems or necessary maintenance for the gas control system 100 and optimize use of the gas control system 100.

In other aspects, sensor data can include information from which destruction of green house gases can be determined or tracked. Such data can be used to obtain carbon credits, which can be sold or traded on exchange markets, such as Chicago Climate Exchange where carbon credits can be purchased to offset emissions by third parties. Sensors 134 can be configured to obtain data, such as flow of gas, gas content and destructive efficiency of the gas control system 100. Alternatively, sensors 134 can determine energy used by engine 114 allowing the manager component 132 to compute the amount of gas destroyed by operation of the gas control system 100. The sensor data can be maintained by the manager component 132 for evaluation and obtainment of carbon credits. In another embodiment, sensor data collected by the manager component 132 provides a mechanism for auditing the performance of the gas control system 100 to eliminate or reduce green house gases. Sensor placement and evaluation of sensor data is described in further detail below.

The manager component 132 can utilize the obtained sensor data to optimize operation of the gas control system 100. In aspects, the gas control system 100 can include one or more actuators (not shown) that control operation of the engine 114 or other components of the gas control system 100. For example, engine throttle can be controlled by an actuator directed by the manager component 132 based at least in part upon received sensor data. In addition, the manager component 132 can determine when automatic shutdown and/or restart are desirable perform shutdown or restart using one or more actuators. Particular actuators are described in detail below with respect to FIG. 11.

Figure 2:
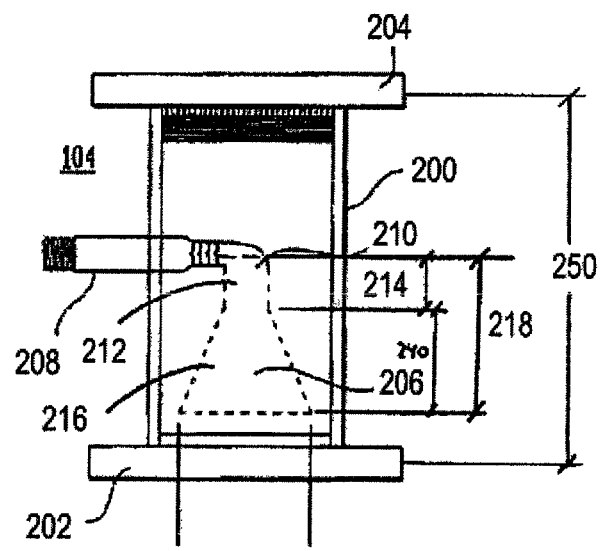
FIG. 2 is a planar side view of an aspect of a fuel collector in accordance with an aspect of the subject matter described herein.
Figure 4:
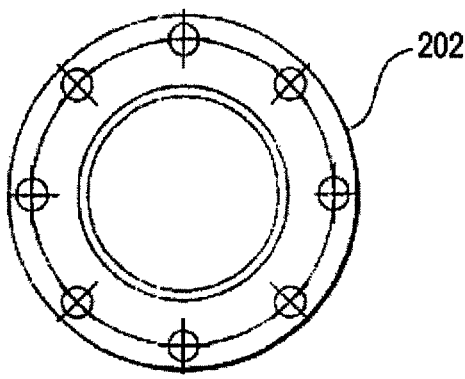
FIG. 4 is a planar bottom view of the first flange of a fuel collector in accordance with an aspect of the subject matter described herein.
Figure 5:
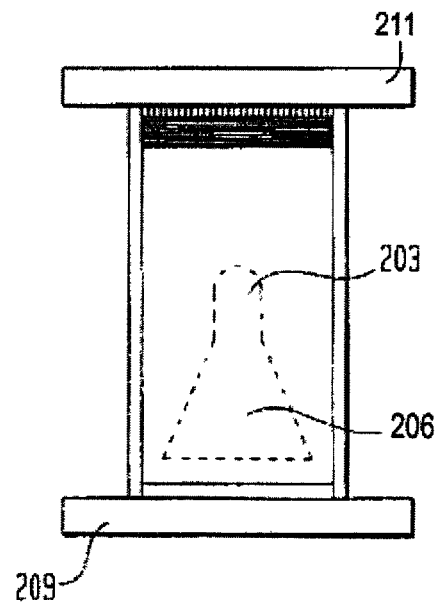
FIG. 5 is a planar front view the fuel collector in accordance with an aspect of the subject matter described herein.

Referring now to FIGS. 2, 3, 4 and 5, views of an exemplary embodiment of a fuel collector 108 are depicted. FIG. 2 illustrates a planar side view of a fuel collector 108. The fuel collector 108 can be made from a pipe 200 (e.g., a standard twelve inch) that is nipple sized to fit the plumbing and displacement of the blower 102. As illustrated in detail in FIGS. 3 and 4, the pipe 200 has a first flange 202 for connecting the fuel collector 108 to the discharge unit, and a second flange 204 that encloses the interior of the fuel collector 108. In one embodiment the first flange 202 is a weld on flange and the second flange 204 is a screw on flange.

The fuel collector 108 internally houses a funnel 206 connected to a discharge pipe 208 by an elbow 210. As depicted the funnel 206 can be conical for use with a round pipe; however, the funnel can be shaped to correspond to other pipe geometries. The conical funnel 206, elbow 210, and discharge pipe 208 can be made of stainless steel, but can alternatively be made of other materials known to one of ordinary skill in the art. The conical funnel 206 is positioned near the bottom of the fuel collector 108 such that the opening of the conical funnel 206 faces the first flange 202. The first flange 202 has an opening corresponding to the width of the conical funnel 206 to allow the passage of the air stream from the discharge section 103 of the blower 102 into the conical funnel 206. In an embodiment, the conical funnel 206 has an opening of about 4.5 inches. The discharge pipe 208 can extend horizontally through the side wall of the pipe 200. In an embodiment, adapted for use with a twelve inch diameter standard pipe, the discharge pipe 208 is approximately 5 to 5.5 inches long and has a diameter of approximately 1 inch.

The conical funnel 206 can have an overall length 218 defined from the centerline of the portion of the elbow 210 axially aligned with the discharge pipe 208 to the distal end of the conical funnel 206. The conical funnel 206 can be comprised of a transition section 212 with a transition length 214 and a reducer section 216 with a reducer length 240 defined from the point where the reducer section 216 begins increasing in diameter relative to the transition section 212. In one embodiment, the transition length 214 is effectively zero and the reducer section 216 abuts the elbow 210. In another embodiment, the overall length 218 of the conical funnel 206 is selected such that the flow of gas, in the elbow 210 is substantially free flowing after passing through the reducer section 216 and the transition section 212 with effectively no choking of the flow. In yet another embodiment, the overall length 218 of the conical funnel 206 is selected such that the flow of gas through the discharge pipe 208 prior to reaching the primary fuel line 122 is substantially uniformly mixed and free flowing. In still another embodiment, the overall length 218 is sized such that the engine 114 is supplied with a substantially uniform, mixed flow of gas from the air stream containing methane gas from the borehole. In yet another embodiment, the reducer length 240 is about 10 inches. In still another embodiment, the reducer length 240 is between about 8 inches and about 12 inches. The pipe length 250 of the pipe 200 is sized to accommodate the full length of the conical funnel 206.

Figure 6:
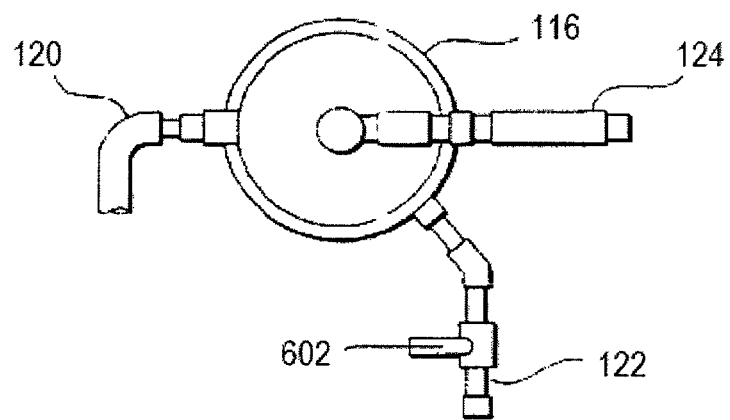
FIG. 6 is a planar top view of an inner section of a heated dryer including the primary fuel line, the secondary fuel line, and the fuel collector line in accordance with an aspect of the subject matter described herein.
Figure 7:
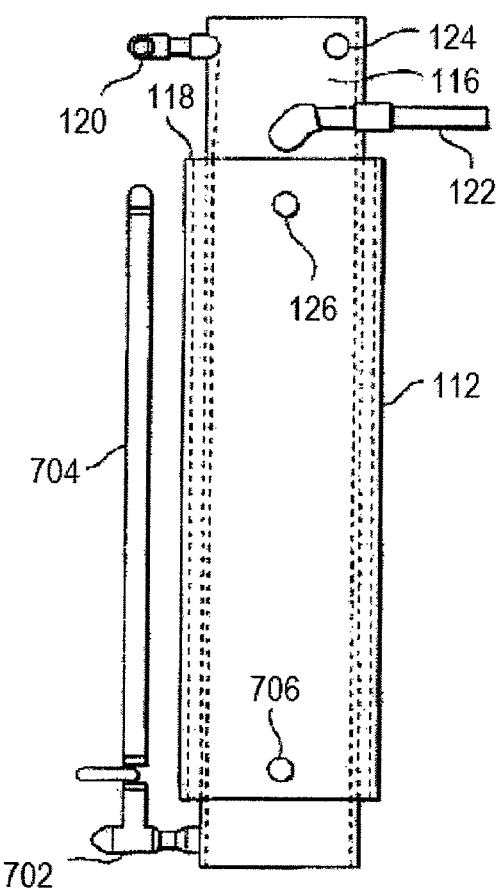
FIG. 7 is a planar side view of a heated dryer including the vertical column in accordance with an aspect of the subject matter described herein.
Figure 8:
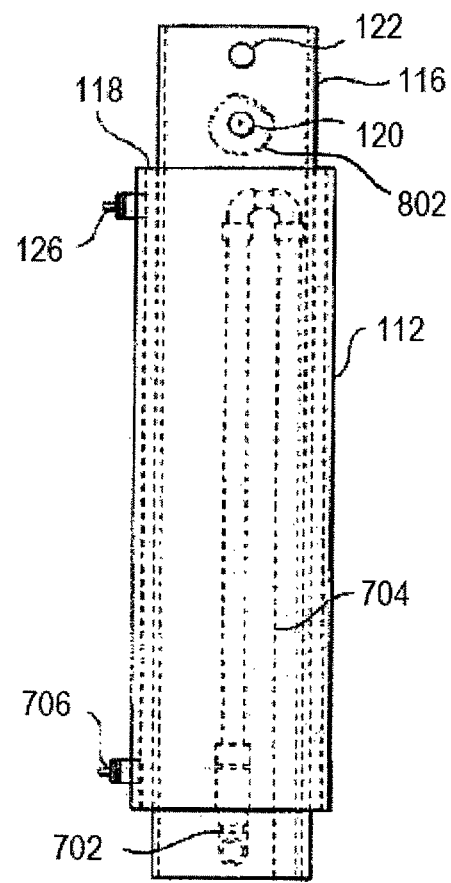
FIG. 8 is a planar front view of a heated dryer in accordance with an aspect of the subject matter described herein.

Referring now to FIGS. 6, 7, and 8, exemplary aspects of a heated dryer 112 are illustrated. The heated dryer 112 can collect and eliminate moisture from the air stream containing the gas and forwards the "dry" gas to the engine 114. Ideally, the air stream extracted from a borehole contains pure, concentrated methane gas; however more often, the air stream contains dilute methane gas along with various contaminants. The heated dryer 112 can serve as a mechanism to purify the methane gas in the air stream and improve the quality of the methane gas provided to the engine 114.

The heated dryer 112 includes an inner section 116 and a jacket 118 that surrounds the inner section 116. The inner section 116 is designed to receive the air stream containing the methane gas from the fuel collector 108. The inner section 116 includes a freely moving baffle that directs the air stream downward.

As shown in FIG. 6, the interior of the inner section 116 can be accessed by three lines: a fuel collector line 120, a primary fuel line 122, and a secondary fuel line 124. The fuel collector line 120 is connected to the discharge pipe 208 of the fuel collector 108. The primary fuel line 122 can include a methane control valve 602 for regulating the flow of methane gas from the fuel collector 108 to the engine 114. The secondary fuel line 124 bypasses the special choke 130 and introduces methane directly into the air cleaner 128. The fuel collector line, primary fuel line and/or secondary fuel line can be a flexible hose, but can alternatively be any other connecting means known to one of ordinary skill in the art, such as stainless steel pipe. One embodiment of the methane control valve 602 is controlled by an actuator to open, close and otherwise modulate the flow of gas from the fuel collector 106 to the engine 114.

Referring now to FIG. 7, the inner section 116 further includes a mechanism for eliminating moisture that is collected from the air stream containing the methane gas. The mechanism for eliminating moisture can include a valve 702 at the bottom of the inner section 116 that is open to the atmosphere, and a vertical column 704. The vertical column 704 is calibrated to match the blower 102 pressure exerted on the interior of the inner section 116, and also provides an hydraulic seal to the atmosphere due to the height of the vertical column 704.

In an alternative embodiment of the heated dryer 112, the inner section 116 further comprises a venturi 802, shown in FIG. 8, located at or near the area where the fuel collector line 120 enters the heated dryer 112. The venturi 802 is designed to drop the relative pressure of the incoming gas (methane) flow from the fuel collector line 120. The lower air pressure in the methane flow entering the heated dryer 160 caused by the venturi 802 condenses water out of the fluid flow, thereby providing an initial dehydration or drying of the methane flow. The venturi 802 can take multiple forms known to those of ordinary skill in the art including a venturi or orifice plate, divergent nozzles or a reduced diameter section of the fuel collector line 120 immediately prior to entering the heated dryer 112. The length of the fuel collector 108 and specifically the overall length 218 of the conical funnel 206 is selected such that once the flow of gas passes from the conical funnel 206, through the discharge pipe 208 and the fuel collector line 120 to the venturi 802; it is a substantially uniform, free flowing, fully developed flow of gas. The overall length 218 can be adjusted by one of ordinary skill in the art to provide greater uniformity of flow for given flow conditions of the gas within the fuel collector 108.

The jacket 118 of the heated dryer 112 keeps the inner section 116 at a stable temperature. In one embodiment, the jacket 118 receives one or more coolant lines from the engine 114. The first coolant line 126 can be connected near the top of the jacket 118 and the second coolant line 706 can be connected near the bottom of the jacket 118. The jacket 118 can contain interior plumbing (not shown) that is outside the inner section 116. The interior plumbing can be connected with the first and second coolant lines 420, 430 such that engine coolant can be piped into the jacket 118 from the engine 114, thereby maintaining the temperature of the jacket 118 at about engine coolant temperature. As a result, the jacket 118 remains at a relatively stable temperature and functions to prevent the gas within the inner section 116 of the heated dryer 112 from freezing. This allows the gas control system 100 to be effectively utilized in freezing weather, and with high humidity flows. In another embodiment the heated jacket 118 possesses an independent means for maintaining temperature such as a series of resistive heaters affixed to the outer wall of the inner section 116. In still another embodiment a separate heater, such as a resistive heater, is affixed to or placed near the venturi 802 to provide heat directly to the venturi 802 to prevent localized condensate from freezing on the surface of the venturi 802.

Figure 9:
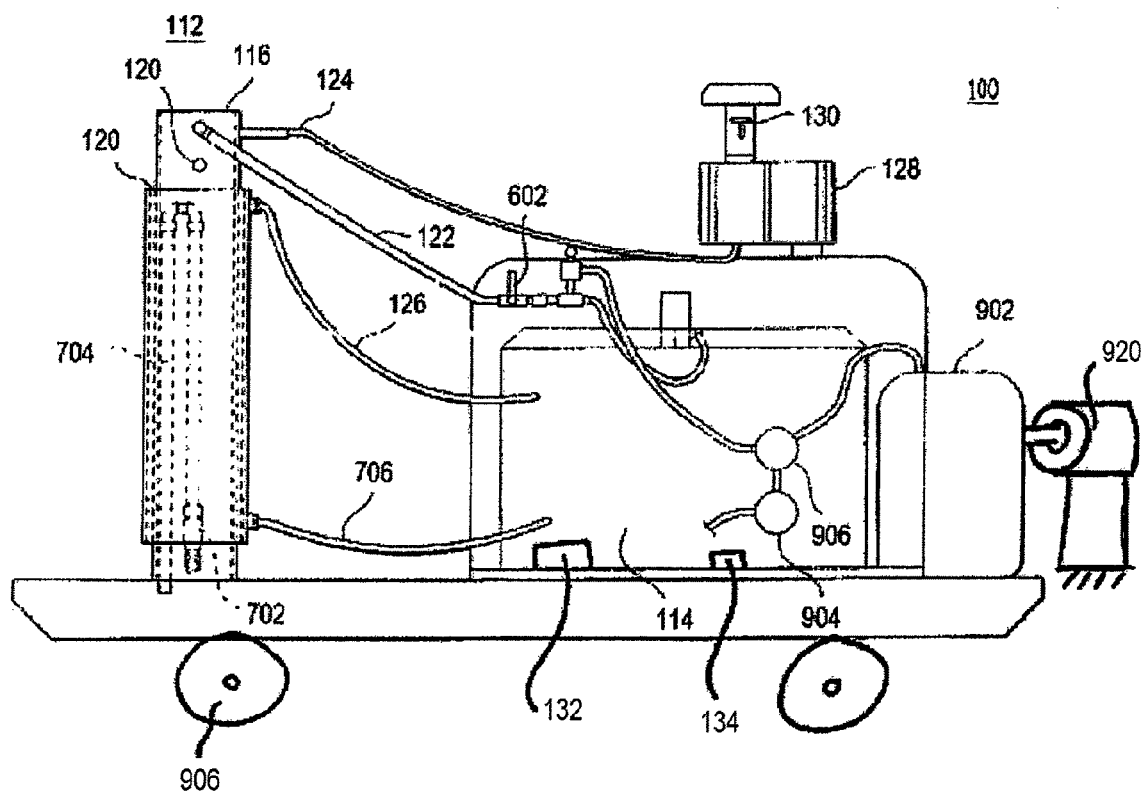
FIG. 9 is a planar front view of a blower, fuel collector, heated dryer, and engine of a gas control system in accordance with an aspect of the subject matter described herein; and, FIG. 10 is a block diagram of a controller system for in accordance with an aspect of the subject matter described herein.

Referring now to FIG. 9, an embodiment of the gas control system 100 is illustrated. The engine 114 of the gas control system 100 is connected to the heated dryer 112, and is at least partially fueled by the collected gas. In one embodiment, the engine 114 is a spark ignition engine having a standard carburetor with a venturi attached (not shown). The engine 114 can include an air cleaner 128 for cleaning atmospheric air before it enters the carburetor, and a special choke 130 mounted in the atmospheric air stream between an air inlet bonnet and the air cleaner 128. The special choke 130 can be manually adjusted by one of ordinary skill in the art by opening or closing a butterfly valve that is locked in place with a thumb screw on a quadrant to regulate the atmospheric air flow into the engine according to the desired air to fuel ratio. Alternatively, the special choke 130 can be automatically adjusted using an actuator controlled by the manager component 132 or other via another external input. In the embodiment depicted a second muffler 150 is affixed to the engine 114 shown in FIG. 1. The second muffler 150 muffles the exhaust of the engine 114 and in some embodiments provides secondary pollution controls, such as a catalytic converter, soot capture system, or other emissions controls devices for cleaning the exhaust of the engine 114 prior to release to the atmosphere.

The engine 114 is fed by two fuel lines: the primary fuel line 122 and the secondary fuel line 124. The primary fuel line 122 transports methane gas from the inner section 116 of the heated dryer 112 through a methane control valve 602 and to the venturi on the carburetor. The air to fuel ratio of the methane gas from the primary fuel line 122 is regulated by the special choke 130. The special choke 130 is opened to allow atmospheric air to mix with concentrated methane gas, and is closed to prevent the mixing of atmospheric air with diluted methane gas. Unlike the primary fuel line 122 that is regulated by the methane control valve 602 and the special choke 130, the secondary fuel line 124 bypasses the special choke 130 and is connected directly to the air cleaner 128. This allows an additional means for an operator to regulating the air to fuel ratio of the methane gas entering into the engine 114.

The gas control system 100 can also include a liquid petroleum (LP) gas system 902 that allows the engine 114 to function as in any conventional LP gas application. The engine 114 further includes an LP gas fuel regulator 904 for metering LP gas into the methane gas stream, and an LP gas separator 906. In one embodiment, the LP gas fuel regulator 904 is controlled by an actuator that can be addressed and controlled in response to external inputs thereby allowing the flow of LP gas to the engine 114 to be actively modulated during operation of the gas control system 100. In one embodiment of the gas control system 100, the methane control valve 602, special choke 130, LP gas fuel regulator 904, and throttle are adjusted either individually or in concert in response to the engine load and methane fuel quality in addition to other factors that normally impact engine 114 performance such as external air temperature.

In other aspects, the gas control system 100 can include or be connected to a generator set 920. Accordingly, the gas control system 100 can generate electricity. Alternatively, the resistance of the generator effects load on the engine 114 and therefore fuel consumption. In still other aspects, the gas control system 100 can include wheels 906 or simply be mounted on a sled or pallet for transportation to and from bore hole sites. The gas control system can be easily repositioned to maximize utility.

The gas control system 100 can be used to extract methane gas from mines and landfills. Efficient utilization of methane gas extracted from coal mines is often hindered due to the impure nature and relatively low quality of the methane recovered. For example, many of the previous systems designed to eliminate and run on methane gas require the air stream to contain about 65% to about 70% methane, while the air streams flowing from boreholes often contain as little as 30% methane. Pure methane, as well as natural gas, is about a 1,000 BTU fuel, however much of the methane extracted from boreholes ranges from about 300-700 BTUs. The gas control system 100 described herein is particularly useful because the engine 114 will continue to run with 300 BTU methane, whereas previous systems required 600-700 BTU per cubic foot methane.

In operation, the blower 102 can be placed in proximity to a borehole and pulls or generates a stream of air from the borehole. The inlet 104 is connected to or mated to the borehole in a manner whereby the vacuum generated by the blower 102 causes the generation of the air stream from the borehole. The inlet 104 of the blower 102 collects the gaseous air stream and forces it out through the blower discharge section 106. The air stream is forced out of the discharge section 106 and into a fuel collector 108 mounted on top of the discharge section 106 and in the path of the air stream. The air stream enters the fuel collector 108 through a first flange 202 having an opening corresponding in size to the diameter of the opening in the conical funnel 206 contained within the fuel collector 108. The air stream is collected by the conical funnel 206 and is forced through an elbow 210 and into a discharge pipe 208 that extends horizontally through a vertical wall of the fuel collector 108.

The discharge pipe 208 of the fuel collector 108 is connected to the heated dryer 112 by a fuel collector line 120. The air stream is forced by the blower 102 pressure through the fuel collector line 120 and into the inner section 116 of the heated dryer 112. As the air stream enters the inner section 116 of the heated dryer 112, a baffle directs the air stream downward. Moist air containing heavier water molecules precipitates to the bottom of the inner section 116, while lighter methane gas remains at the top of the inner section 116. Moisture, i.e., water, accumulating in the bottom of the inner section 116 is expelled through an opening near the bottom of the inner section 116. In particular, the opening can be about 2 inches from the bottom of the inner section 116. This phenomenon occurs in part because of the pressure exerted on the interior of the inner section 116 by the blower 102. A vertical column 704 is calibrated according to the blower 102 pressure, and the result is a hydraulic seal that draws the moisture out of the bottom of the inner section 116 and through the vertical column 704 to the atmosphere through a valve 702. In an embodiment, the blower 102 exerts about 1 psi of pressure on the interior of the inner section 116; therefore the vertical column 704 can be calibrated for about 28 inches of water. As the accumulated moisture reaches the height of the opening in the bottom of the inner section 116, the blower 102 pressure forces the water into the opening and a hydraulic seal is formed. With proper calibration, the water will be automatically drawn through the vertical column 704 and out of the inner section 116 into the atmosphere. As a result, the gas control system 100 automatically removes and eliminates moisture from the methane gas contained in the air stream.

While the collected moisture is eliminated through the bottom of the inner section 116, the lighter methane gas remains at the top of the inner section 116 of the heated dryer 112. The methane gas is extracted from the heated dryer 112 by a primary fuel line 122 attached near the top of the inner section 116. The primary fuel line 122 runs from the top of the inner section 116 of the heated dryer 112 to a venturi mounted on the engine 114 carburetor. The flow of methane through the primary fuel line 122 is regulated by a methane control valve 602.

The engine 114 includes a special choke 130 that restricts atmospheric air flow into the engine 114. For example, when high quality or concentrated methane is being run through the gas control system 100, the special choke 130 is placed in the open position thereby allowing the free flow of atmospheric air into the carburetor of the engine 114. On the other hand, when low quality or diluted methane is collected by the gas control system 100, the special choke 130 can be placed in a closed position, thereby reducing the amount of atmospheric air that mixes with the methane in the carburetor. The special choke 130 can be used in conjunction with the methane control valve 602 to establish the proper air to fuel ratio (about 10 to about 15 parts air to about 1 part fuel), thereby allowing the engine 114 to run on low quality methane. The special choke 130 and methane control valve 602 can be manually adjusted or may be controlled by actuators directed by the management component 132.

In addition to the primary fuel line 122, there is also a secondary fuel line 124 that runs from the heated dryer 112. The secondary fuel line 124 bypasses the special choke 130 and is connected directly to the carburetor via the air cleaner 130. As a result, the secondary fuel line 124 functions as yet another mechanism to regulate the air to fuel ratio. For example, when low quality methane, or high oxygen content, is present, the special choke 130 can be placed in a closed position to prevent additional atmospheric air from mixing with the dilute methane gas. However, in the event that closing the special choke 130 reduces the air content too much, the secondary fuel line 124 can be opened, introducing additional methane gas and oxygen to the air-fuel mixture.

The gas control system 100 also includes liquid petroleum (LP) system 902 that can be piped into the engine 114. In the absence of methane or if insufficient amounts of methane are collected, the LP system 902 can be used as in any conventional LP gas application to run the engine 114. Additionally, LP gas can be metered into the methane gas stream using the second stage fuel regulator 904 mounted on the engine to raise the overall available fuel content in the flow prior to use in the combustion chamber of the engine 114.

The gas control system 100 described herein may be particularly useful because it can be used to regulate gases in a wide range of conditions. The heated dryer 112 allows the gas control system 100 to remain operational in freezing weather by eliminating moisture and warming the methane, thereby preventing the fuel from freezing. The engine 114 remains operational regardless of the quality of methane available due to the mechanisms built in to the gas control system 100 for regulating the air to fuel ratio. For example, the gas control system 100 includes a methane control valve 602 on the primary fuel line 122 for regulating the flow of methane to the engine 114, a special choke 130 for restricting atmospheric air flow to the engine 114, and a secondary fuel line 124 that bypasses the special choke 130, and LP gas regulator 904, and throttle control. In one embodiment for a normally aspirated spark ignition engine, the throttle control is achieved via a throttle control body in the carburetor. In the case of a fuel injection engine, the timing of the fuel injector is adjusted. Examples of how these mechanisms are used in various conditions are provided below.

When flammable gas (e.g., methane) is not available, the LP system 902 can be used and the engine 114 runs as in any conventional LP gas application. Additionally, the engine 114 can be started using the LP system 902 and an operator or actuator can then engage the blower 102 thereby generating a stream of air in an effort to gather methane gas from a borehole air stream.

When high quality methane is available, the methane gas is collected in the fuel collector 108 that is attached to the discharge section 106 of the blower 102. The pressure from the blower 102 forces the methane gas into the heated dryer 112 that is kept at a stable temperature due to engine coolant being piped through the jacket 118 that surrounds the inner section 116 of the heated dryer 112. This is especially helpful in freezing weather conditions when the moisture laden air stream would otherwise freeze. The dry methane gas is then passed through the primary fuel line 122, the methane control valve 602, and the venturi mounted on the engine 114 carburetor. The special choke 130 is placed in the open position to permit the mixing of atmospheric air with the high quality (concentrated) methane gas to provide the desired air-fuel mixture to the engine 114.

When the quality of the methane gas is below about 700 BTU per cubic foot the gas control system 100 remains operational. The desired air to fuel ratio is established by regulating the flow of methane gas from the heated dryer 112 through the primary fuel line 122 using the methane control valve 602; restricting atmospheric air flow into the engine by closing the special choke 130; and/or adding methane and air to the mixture by opening the secondary fuel line 124 that bypasses the special choke 130, which can be controlled by actuators referred to generally as engine control actuators. The engine 114, and therefore the gas control system 100, is capable of running with as low as about 300 BTU per cubic foot methane gas in a satisfactory manner.

Figure 10:
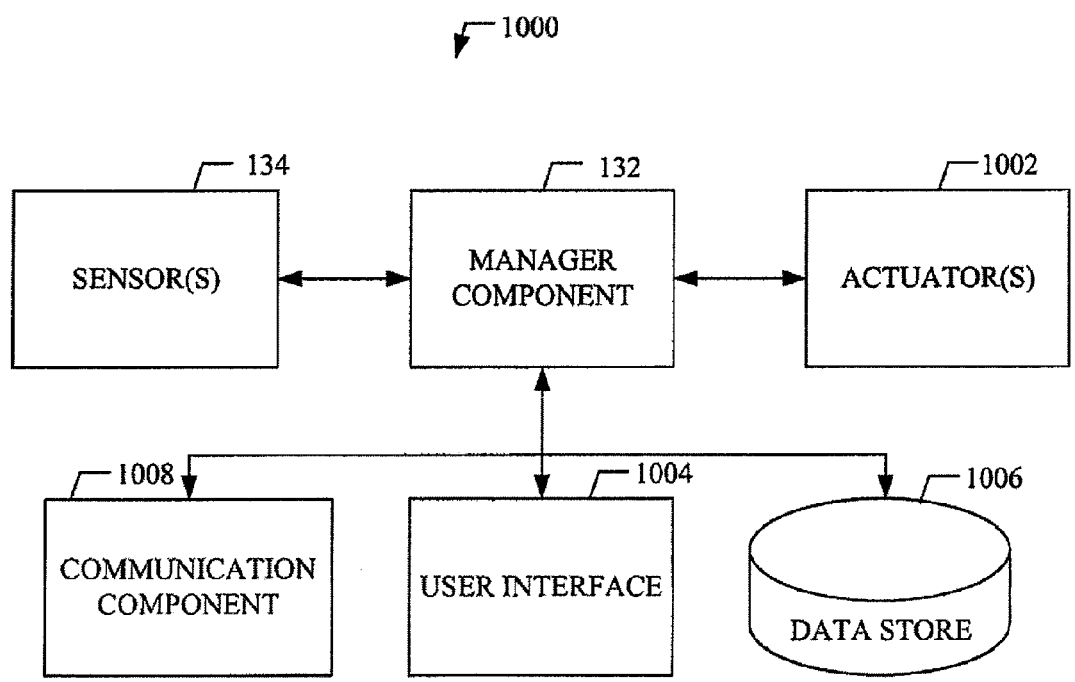

FIG. 10 depicts a subsystem 1000 of the gas control system 100, which monitors, evaluates, and/or controls operation of the gas control system 100. The subsystem 1000 can include one or more sensors 134 that obtain data associated with the current state of the gas control system 100. The manager component 132 can evaluate, manage and/or direct the gas control system 100 based at least in part upon the received sensor data. As used herein, the term "component" can include hardware, software, firmware or any combination thereof. The manager component 132 can be implemented using a microprocessor, microcontroller, or central processor unit (CPU) chip and printed circuit board (PCB). Alternatively, the manager component 132 can include an application specific integrated circuit (ASIC), programmable logic controller (PLC), programmable logic device (PLD), digital signal processor (DSP), or the like. In addition, the manager component 132 can include memory, whether static memory such as erasable programmable read only memory (EPROM), electronically erasable programmable read only memory (EEPROM), flash or bubble memory, hard disk drive, tape drive or any combination of static memory and dynamic memory. The manager component 132 can utilize software and operating parameters stored in the memory. In some embodiments, such software is uploaded to the manager component 132 electronically whereby the control software is refreshed or reprogrammed or specific operating parameters are updated to modify the algorithms and/or parameters used to control the operation of the engine 114 and ancillary components.

The manager component 132 can direct operation of the engine 114 and other components of the gas control system 100 via one or more actuators 1002. As described in detail below, the actuators 1002 can modulate the fuel-air mixture received at the engine, ignition, shutdown, flow of LP fuel and other factors that affect operation of the gas control system 100. In one embodiment, the manager component 132 can shutdown and restart the gas control system 100 utilizing the actuators 1002. For example, shutdown can include disengagement of the blower 102, turning off the engine 114, and shutting off the flow of gas to the engine 114. In aspects, the manager component 132 can also restart the gas control system 100 utilizing one or more actuators 1002. Restart can include starting the engine using LP fuel, reengaging the blower 102 and adjusting the special choke 130 and other engine control actuators 1002. The manager component 132 can evaluate the received sensor data and determine the particular actuator 1002 operations to optimize engine operation.

The subsystem 1000 can also include a user interface 1004 which can communicate directly with the manager component 132 or via the communication component 1008 (described in detail below). The user interface 1004 can provide feedback to local operators on the operation of the gas control system 100 and other details about the system performance and environment, including for example, the borehole methane levels, by outputting information via indicator lights, codes transmitted via ports such as a serial, infrared, or short range wireless communications interface, or graphical displays with readable codes or graphics output. The user interface 1004 may be a graphical user interface (GUI) and can include an external display, panel or monitor that provide information pertaining to the engine 114 operation or, in alternative embodiments, provides graphical displays of engine 114 performance and operation including aggregate performance over time. In addition, operators can utilize the user interface 1004 to update or modify algorithms and/or parameters used to control operation of the engine and ancillary components. For example, operators can utilize the user interface 1004 to set conditions for automatic shutdown, wait time and automatic restart of the gas control system 100.

The subsystem 1000 can also include a data store 1006 that maintains data associated with operation of the gas control system 100. In aspects, sensor data received by the manager component 132 can be maintained in the data store 1006 for further evaluation or analysis. As used herein, a "data store" is any collection of data (e.g., file, database, cache). The collected sensor data can be used to identify trends and provide operators with a record of operating conditions over a period of time. In aspects, the manager component 132 can evaluate sensor data collected over time to predict maintenance requirements and notify operators via the user interface 1004.

Data maintained in the data store 1006 can be used to track or compute consumption of greenhouse gases by the gas control system 100. Based upon sensor data, such as engine output and LP fuel use, the manager component 132 can compute the volume of collected gas consumed by the engine 114. Alternatively, sensor data can include content of greenhouse gas (e.g., methane) within the collected gas, flow of collected gas and efficiency of engine in destroying greenhouse gases. The manager component 132 can record data related to consumption and/or elimination of greenhouse gases. Such records can be used to obtain Carbon Credits on certain environmental exchanges (e.g., Chicago Climate Exchange) or be used to offset third party emissions.

The subsystem 1000 can also include a communication component 1008. The manager component 132 can be connected to a remote monitoring and control station (not shown) through the communication component 1008. In another embodiment, the communication component 1008 can be connected to an external data modem or communication line. Alternatively, the communication component 1008 can be a data modem that converts the signals from the manager component 132 into a signal suitable for transmission over the external data link. For example, the external data modem can be a radio frequency (RF) modem such as a cellular data network typified by, but not limited to GPRS, EDGE, UMTS, 1xRTT, or EV-DO, a wireless local or wide area network, typified by IEEE 802.11x standards, an ad hoc or mesh wireless network, or alternatively, the data modem can be point-to-point. In still another embodiment, the external data modem is a wired modem connected to a wired communication line such as a traditional telephone system line, fibre optic line, a circuit switched data line, or a packet switched data line. Alternatively, the manager component 132 can be directly connected to an external communication network, whereby the manager component 132 operates as a data server on the computer network providing information in response to queries from other machines on the network.

The manager component 132 can operate as a data server providing information on the current operating state and performance of the gas control system 100 and/or the engine 114 and ancillary components over time. In one embodiment, a single gas control system 100 provides data to an external user or external system via the communication component 1008. In one embodiment, the communication component 1008 and the manager component 132 provide a communication server interface that enables the system 100 to provide data and results in response to external queries, including responses using hypertext markup or extensible markup languages. In yet another aspect, the gas control system 100 provides output to external services at regular intervals or when specific operating conditions are reached. In one exemplary embodiment, the manager component 132 uses the communication component 1008 to broadcast a message, using for example a short messaging system (SMS) protocol to a wireless device indicating the system is shutting down due to the methane gas levels in the borehole reaching a critical low explosive limit, or opening a connection to an external data system to push or upload data at predefined intervals.

In still another embodiment, a coordinating manager system 1200, that operates on a separate gas control system 100 or a stand alone computer platform is provided. In this embodiment, multiple remote gas control systems 100 are interfaced with the coordinating manager system 1200. The coordinating manager system 1200 in one embodiment collects data from the remote gas control systems 100 via the communication component 1204 for storage and processing in the coordinating manager system 1200. In addition, the coordinating manager component 1202 can utilize the communication component 1204 to alert operators to possible problems. For example, automated messages indicating possible or actual failure can be transmitted as voice messages, text messages, email messages or using any other reasonable communications method. In this embodiment, arranging multiple remote gas control systems 100 relative to a coordinating manager system 1200, it is possible to use short range, unregulated, or lower cost wireless or wired communication components 1008 on the gas control systems 100 to communicate with a remote, but geographically local coordinating manager system 1200. In one exemplary embodiment, these short range, wireless communication components 1008 form a mesh network across the multiple gas control systems 100 to allow communication by and between the multiple communication components 1008. Then the coordinating manager system 1200 may interface via a wide area interface on the communication component 1204 such as the previously described mentioned mobile data networks.

In other aspects, the communication component 1008 can be used to remotely control the gas control system 100. The manager component 132 can receive instructions from an external source to adjust the operation of the engine 114, fine tune specific operating parameters, or otherwise override or modify the control software or the parameters used by the manager component 132 to control the operation of the engine 114. In addition, such instructions can direct shutdown and restart of the gas control system 100.

A second computer or manager component 132 (not shown) can be connected to the communication component 1008. As discussed in detail below with respect to FIG. 12, the second computer or manager component 132 can used to control the overall operation of a single or multiple gas control systems in unison. For example, the second computer can provide overall operational commands for one or more manager components 132 to control the startup/shutdown or increase power generation in response to external factors.

Figure 11:
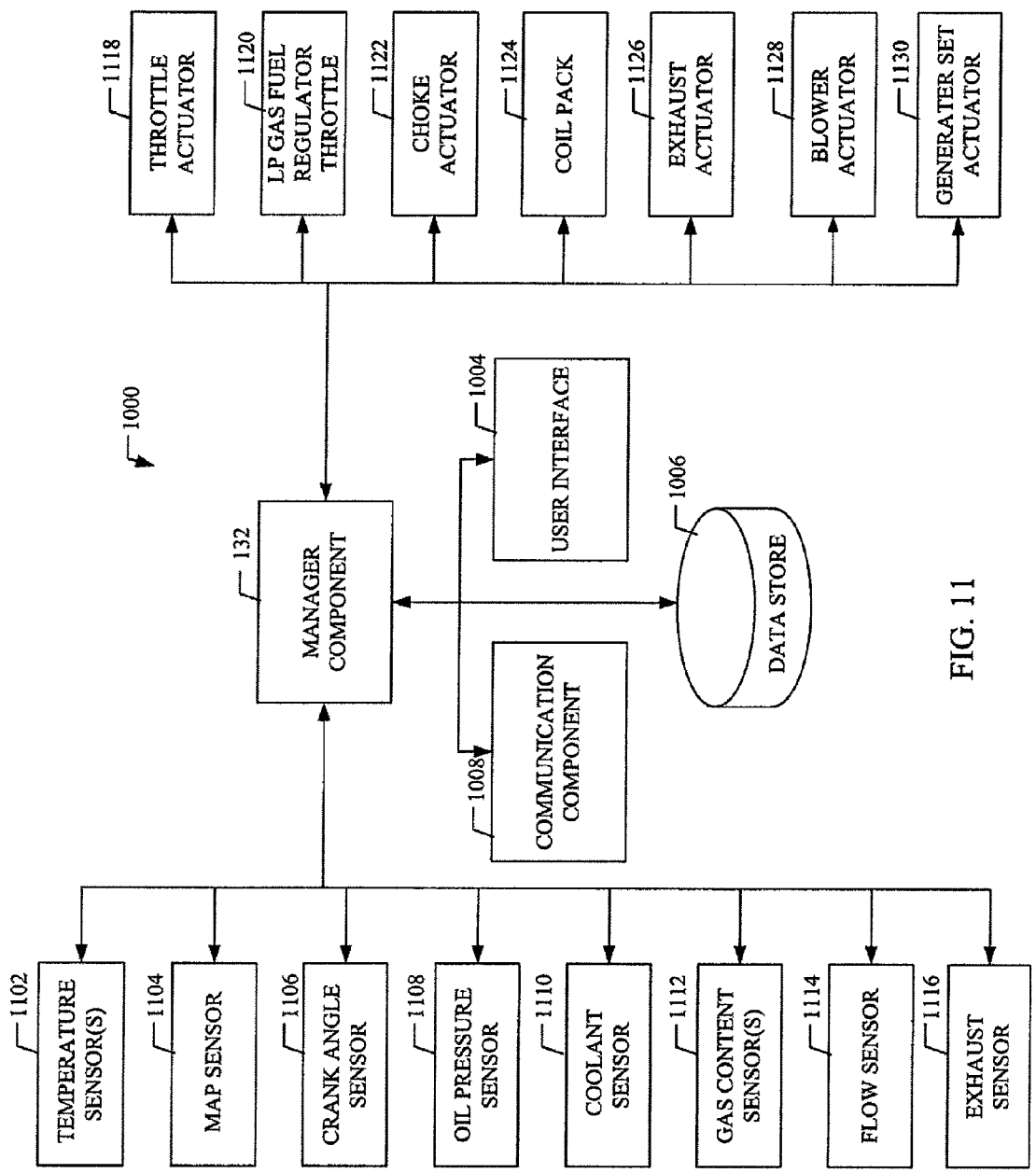
FIG. 11 is a more detailed block diagram of a controller system.

Turning now to FIG. 11, a more-detailed block diagram of an exemplary subsystem 1000 is illustrated. The gas control system 100 can include any number of sensors 134 that provide control inputs to the manager component 132. For example, an air temperature sensor 1102 can measure the incoming or outside air temperature. The incoming air temperature measurement can be used to estimate the relative density of oxygen in the incoming air in order to fine tune the operation of the engine 114 based on the amount of combustible oxygen available. In another embodiment, a second air temperature sensor 1102 can be incorporated into the primary fuel line 122 and/or the secondary fuel line 124 to measure the relative temperature of the incoming fuel or methane from the heated dryer 112.

A manifold air pressure (MAP) sensor 1104 can also be incorporated in the subsystem 1000. The MAP sensor 1106 can measure the pressure in the manifold of the engine 114, or in the case where the special choke 130 is allowing methane into the air charge for the engine 114, the MAP sensor 1106 measures the pressure of the air-methane mixture in the inlet manifold. The MAP sensor 1104 can provide feedback to the manager component 132 of engine load. In particular, vacuum in the inlet drops when the engine 114 is under load or laboring. Such feedback can be used by the manager component 132 to adjust the timing and/or fuel-air mixture of the engine 114 to keep the engine 114 running at or near its optimal levels. A crank angle sensor 1106 can provide feedback to the manager component 1004 regarding the crank position of the engine 114 necessary for timing the firing of the spark plugs in the individual cylinders. Engine health feedback can be obtained from an oil pressure sensor 1108 and coolant temperature sensor 1110. Additionally, an exhaust sensor 1112 can obtain data regarding system exhaust, such as levels of nitrous oxide, sulphur dioxide, carbon monoxide or other volatile organic content (VOC) within the exhaust. Other sensors inputs can be added to the subsystem 1000 as known to those skilled in the art including for example, accelerometers for knock detection, cylinder pressure sensors, and exhaust gas measurement sensors among others, to improve engine 114 performance, increase the range of fuels used by the engine 114 or achieve more efficient fuel usage or meet specific environmental standards.

In addition, sensors 134 can be used to determine or estimate destruction of greenhouse gases. In one embodiment, a gas content sensor 1114 or methane content sensor (e.g., infrared gas analyzer, gas chromatograph, or thermal conductivity detector) can be used to measure the relative fraction of methane coming from the heated dryer 112 through the primary fuel line 122 and the fuel methane line 124. A flow sensor 1116 can be used to measure the flow of gas collected from the source. The flow sensor 1116 can be a differential pressure monitor (e.g., an orifice plate, a venturi tube, pitot tube, or averaging pitot tube) or any other suitable device. Using the sensor data recorded by the sensors 134 detailed in this paragraph, the manager component 132 or an external user can estimate the quantity of methane removed from the borehole and consumed while operating the engine 114 to estimate the quantity of methane or greenhouse gases consumed by the gas control system 100. This data, on flow and content data, as well as destructive efficiency information, can be stored and used to verify destruction of greenhouse gases and to provide audit trails to obtain greenhouse gas emission offsets or credits.

Sensor data can also be used to determine when automatic shutdown of the gas control system 100 is desirable. Typically, flammable gases are combustible only under certain conditions, requiring the correct mixture of gas and oxygen to ignite. Consequently, when the level of gas drops below a selected lower explosive level (LEL), the gas control system 100 can shutdown or cease removing gas, preventing the mixture in the source from becoming combustible. In particular, for methane gas an LEL of about 30% can be used to ensure that the methane emitted from the source does not explode. In other aspects, an LEL of between 20% and 40% is utilized. Accordingly, in some aspects, the manager component 132 samples the sensor data and compares the sampled sensor data to the LEL or other preselected set point. If the gas content has fallen below the LEL, the manager component 132 can utilize actuators 1002 to automatically shutdown the gas control system 100. In other aspects, after waiting a predetermined period of time, the manager component 132 can direct the gas control system 100 to restart. At that time, the manager component 132 can evaluate current gas content and continue operations or shutdown again. The manager component 132 can continue to periodically restart and reevaluate gas content until the levels once again exceed the LEL. In this manner, the gas control system 100 can stabilize methane levels within the mine or in the vicinity of a particular borehole over time.

The subsystem 1000 can also include one or more actuators 1002 to control the operation of the engine 114. In one embodiment, the gas control system 100 can include a single throttle controlled by the manager component 132 using a throttle actuator 1118. The single throttle can control the flow of the primary fuel line 122, potentially augmented by additional LP fuel from the LP gas fuel regulator 904. The throttle can be adjusted to vary the flow of the fuel into the engine 114 in order to maintain a specific engine speed. When the engine 114 is attached to a generator set 920 the engine speed can be selected to maximize the efficiency of the generator set 920. For example, the engine speed can be controlled by the manager component 132 such that the output shaft of the engine 114 connected to the input of the generator set is turning at about 3600 RPM regardless of the quality of gas or methane being supplied from the borehole or the load applied to the output shaft. In yet another embodiment, the manager component 132 also controls the LP gas fuel regulator 904 using a similar throttle 1120. In this manner, the manager component 132 can increase the flow of LP fuel into the engine 114 to make up for deficiencies in the amount of methane supplied to the engine 114. In still another embodiment, the manager component 132 also controls the operation of the special choke 130 associated with the secondary methane line 310 via a choke actuator 1122. The manager component 132 can utilize the choke actuator 1122 to modulate the opening and closing of the special choke 130 to regulate the amount of air from the atmosphere that would be added to the incoming methane from the secondary fuel line 124 that in turn is fed into the engine 114 manifold intake.

In addition to throttle-like controls, the manager component 132 can also control other actuators 1002 associated with the operation of the engine 114. In the embodiment depicted in FIG. 11, the manager component 132 is connected to a coil pack 1124. The signals from the manager component 132 can be used to trigger the individual elements of the coil pack 1124 associated with a specific spark plug in each cylinder of the engine 114 in order to light off or start the combustion of the fuel-air mixture inside that specific cylinder. As the fuel-air mixtures changes and the loading of the engine 114 changes, the manager component 132 can adjust the timing of the spark plug firing to prevent premature ignition (knocking) or late ignition (low power).

In other embodiments, the manager component 132 may utilize an exhaust actuator 1126 to control an exhaust gas regulator (EGR) valve that would direct exhaust gas from the exhaust manifold back into the intake manifold to achieve specific operational, efficiency, and/or environment outcomes. In still another embodiment, the engine control unit 132 can operate one or more blower actuators 1128 to direct the operation of the blower 102 used to pull air from the bore hole such that the blower 102 can be sped up or slowed down based on the use of the engine 114 or turned on and/or off and engaged or disengaged as part of a shutdown or startup process. The manager component 132 can also modulate the operation of the generator set 920 using a generator set actuator 1130. In one embodiment of the gas control system 100, whereby the engine 114 output is connected to a generator set 920, the electrical power output of the generator set 920 is fed into the electrical power grid. In still another embodiment, the electrical power output of the generator set 920 is fed into a load cell or a variable load cell whereby the load on the electrical generator is modulated by the manager component 132 by selecting different loading levels on the load cell to dissipate the power generated by the generator set 920. By directing the generator set, the manager component 132 can control load on the engine 114 and therefore fuel consumption. In still other embodiments, the manager component 132 can modulate the operation of other components associated with the operation of the engine 114 or hardware connected to and associated with the gas control system 100.

Figure 12:
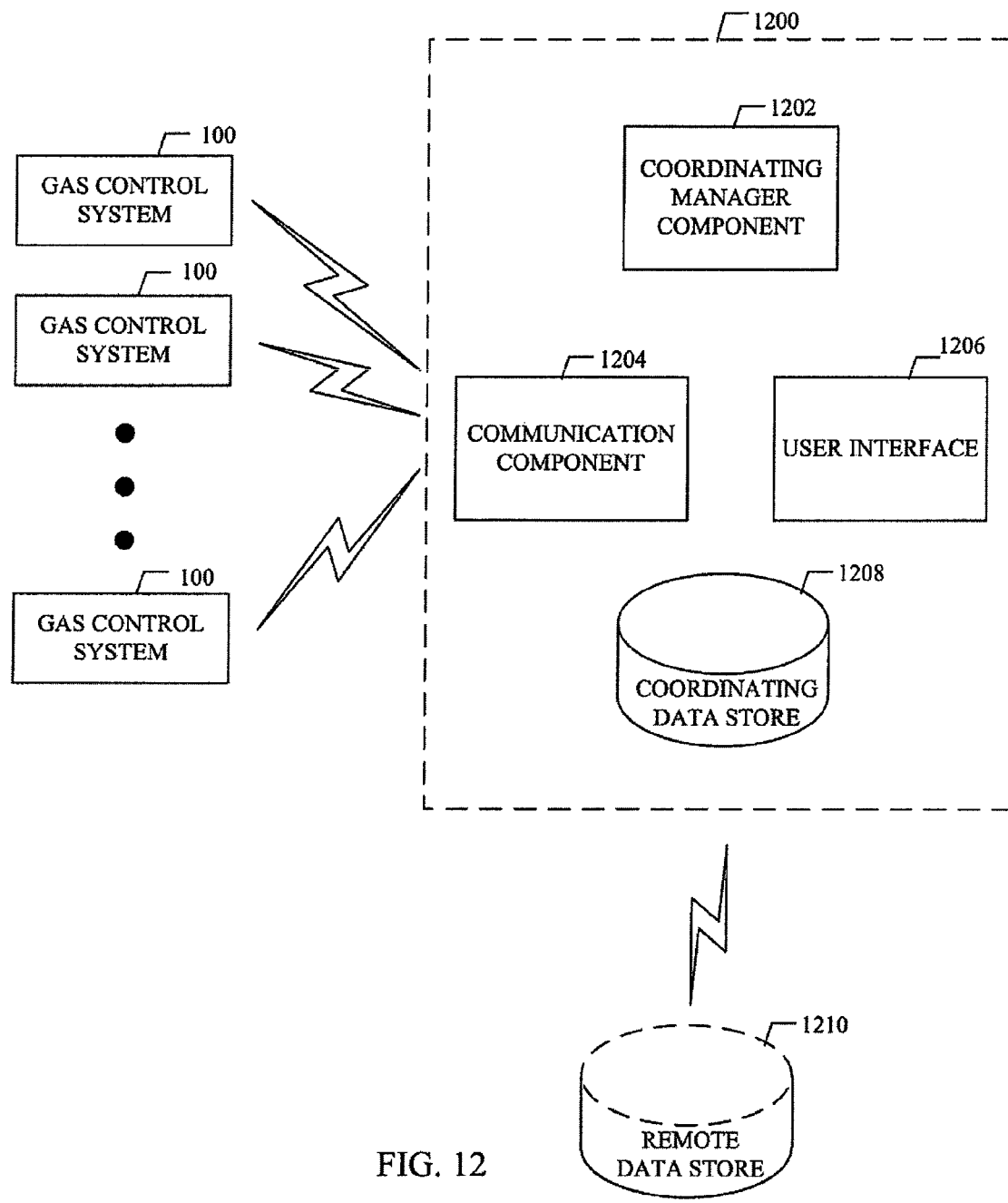
FIG. 12 is a block diagram illustrating an exemplary network including multiple gas control systems.

Referring now to FIG. 12, an exemplary coordinating system 1200 for monitoring and/or controlling one or more gas control systems 100 from a coordinating manager component 1202 is illustrated. One or more gas control systems 100 can communicate with a coordinating manager component 1202 via a communication component 1204 to coordinate, monitor or direct the individual gas control systems 100. In an embodiment, coordinating manager component 1202 be implemented using a gas control system. Any suitable communication protocol can be utilized, including appropriate wired and/or wireless communications.

The system 1200 can include a user interface 1206 that allows an operator to monitor or direct operation of multiple gas control systems 100. For example, the user interface 1206 can be implemented as a graphical user interface (GUI) that displays graphs, diagrams or other indicia of the current or historical status of one or more gas control systems 100. Operators can utilize the user interface to evaluate status, and coordinate or optimize placement and operation of gas control systems 100. For example, the data displayed can be utilized to determine which gas control systems 100 are most and/or least efficient. Those gas control systems 100 determined to be less efficient may be repositioned to optimize efficiency of the group of gas control systems 100. In other aspects, the coordinating manager component 1202 can generate suggestions for repositioning gas control systems 100 to maximize removal of gas by estimating areas of the mine or landfill field where higher concentrations of methane are likely based upon the amounts of methane being recovered by gas control systems 100 in a similar geographic area. In still another embodiment, the coordinating manager component 1200 provides gas control system 100 performance measures to a geographic information system (GIS) database that provides performance plots correlated to geography and allows the overlay of underground structures to assist an operator in determining optimal locations for the placement of gas control systems 100. Such suggestions of desirable locations for placement of the gas control systems 100 can be presented via the user interface 1206.

The system 1200 can also include a coordinating data store 1208 that can maintain data obtained from multiple gas control systems 100. In particular, the coordinating data store 1208 can maintain data related to operating conditions of each of the gas control systems 100, which can be used to evaluate gas control system performance over time 100. The data can be utilized by the coordinating manager component 1202 to identify trends, predict maintenance requirements and detect errors or failures in operation in the gas control systems 100. The coordinating manager component 1202 can notify operators of such problems using the user interface 1206. In other aspects, the coordinating manager component 1202 can utilize the communication component 1204 to alert operators to possible problems. For example, automated messages indicating possible or actual failure can be transmitted as voice messages, text messages, email messages or using any other reasonable communications method.

In an alternative embodiment, the coordinating system 1200 can maintain an aggregate record of destruction of greenhouse gases, which can be monetized. A significant volume of greenhouse gases may be required to make recording of gas destruction worthwhile. The coordinating system 1200 can aggregate the results from multiple, individual gas control systems 100, increasing efficiency and enhancing economic viability of trading in Carbon Credits. In particular, a gas control system 100 provider could maintain a coordinating system 1200 and sell or lease gas control systems 100 to multiple customers. While, it may not be economically worthwhile for the individual customers to track and maintain destruction of greenhouse gases, the provider can aggregate the results from multiple customers. In some aspects, each gas control system 100 can report periodically to the central system 1200. Administration of the records and equipment could be provided by the provider. In still another embodiment, the provider may use the information provided by the multiple distributed gas control systems 100, via a unique identifier associated with each gas control system 100 or in some embodiments a unique customer identifier, correlate the results from the multiple gas control systems 100 to produce pro rata estimates of the relative contributions of the various customer gas control systems 100 for distributions of credits or monetary compensation.

In other embodiments, the coordinating system 1200 can report or record aggregate information in a remote data store 1210. In particular, a site (e.g., coal mine or landfill) can utilize multiple gas control systems 100. One of the gas control systems 100 can be designated as the coordinating system to aggregate data and/or direct the group of gas control systems 100. The coordinating system 1200 can provide data to a remote data store 1210 controlled by the gas control system provider. The individual gas control systems 100 can communicate using WiFi, WLAN or any other suitable means for communicating. The remote data store 1210 in some embodiments represents a secure server that provides an auditable means for recording real-time or near real-time aggregated data with respect to the destruction or elimination of greenhouse gases.

Figure 13:
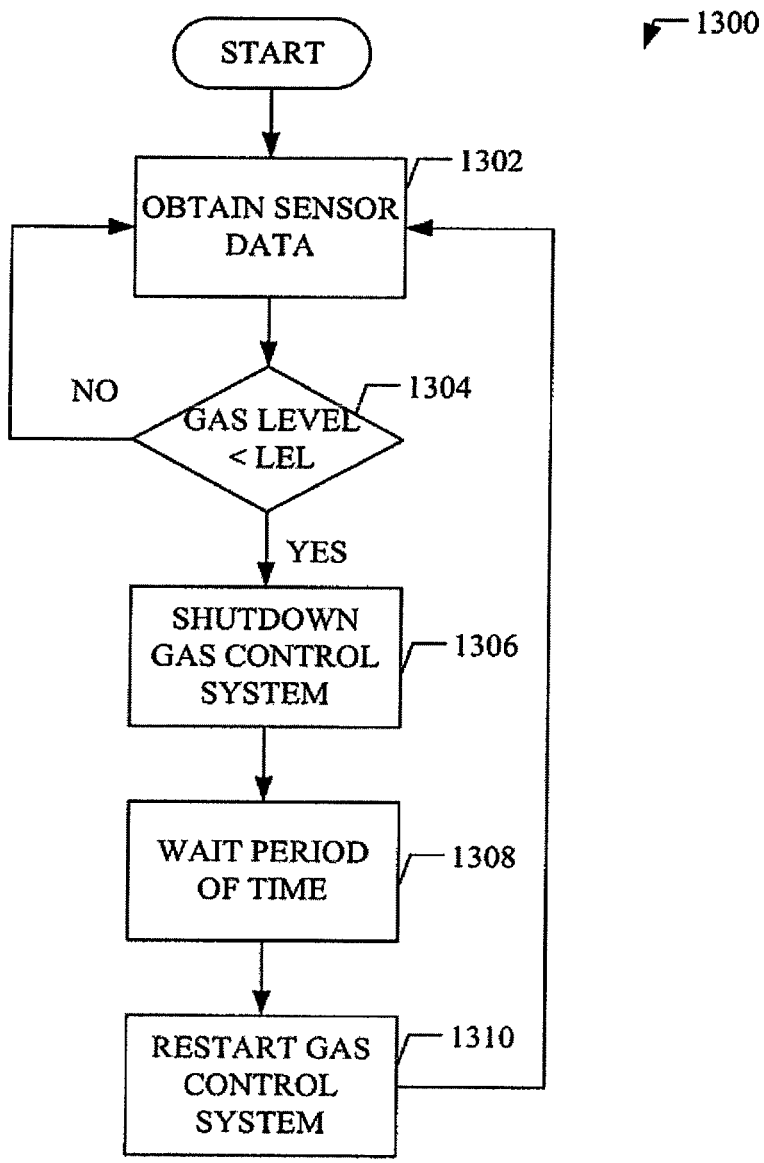
FIG. 13 illustrates steps for automatic shutdown and restart of a gas control system in accordance with an aspect of the subject matter described herein.
Figure 14:
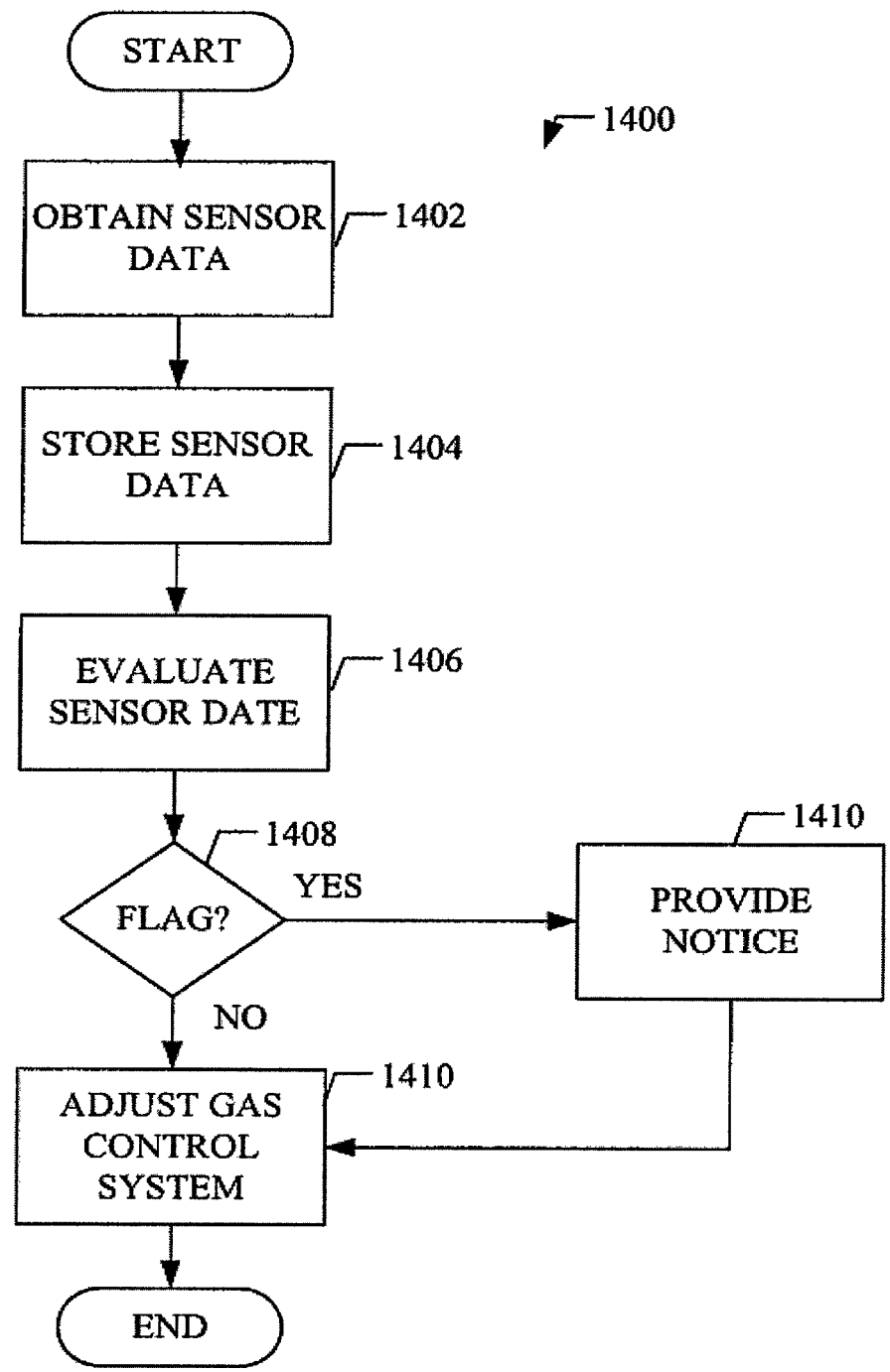
FIG. 14 illustrates an exemplary method for optimizing operation of a gas control system in accordance with an aspect of the subject matter described herein.

With reference to FIGS. 13 and 14, flowcharts depicting methodologies associated with removal of gas from a source are illustrated. For simplicity, the flowcharts are depicted as a series of steps or acts. However, the methodologies are not limited by the number or order of steps depicted in the flowchart and described herein. For example, not all steps may be necessary; the steps may be reordered, or performed concurrently.

Turning now to FIG. 13, a methodology 1300 for performing automatic shutdown and restart of a gas control system 100 is illustrated. At 1302, sensor data is obtained from one or more sensors 134. Sensors 134 can include gas content sensors that determine the percentage or level of gas emitted from the source. As discussed, flammable gases are combustible only under certain conditions, requiring the correct mixture of gas and oxygen to ignite. Consequently, when the level of gas drops below a selected lower explosive level (LEL), the gas control system 100 can shutdown or cease removing gas, preventing the mixture from becoming combustible. In particular, for methane gas an LEL of about 30% can be used to ensure that the methane emitted from the source does not explode. In other aspects, LEL of between about 20% and 40% can be used.

At 1304, the percentage of gas can be compared to the lower explosive level for the particular gas. If the sensor data indicates that the gas level is above the LEL, the gas control system 100 can continue to operate, taking periodic sensor readings at 1302. However, if the sensor data indicates that the gas level has dropped below the LEL, the gas control system 100 can automatically shutdown at 1306. Shutdown of the gas control system 100 can include utilizing an actuator to disengage the blower. In addition, shutdown can include turning off the engine 114 and shutting off flow of methane from the fuel collector 108.

At 1308, the gas control system 100 can wait a predetermined period of time, such as twelve or twenty-four hours. The length of time can be preset by an operator and can be adjusted or updated from time to time by the operator or the manager component 132. In one embodiment, the amount of time the manager component 132 waits 1308 is adjusted based on how long the gas control system 100 operates between one shutdown 1306 period to next shutdown 1306 period. Dwell time can be a predetermined time period that allows for drawing of a fresh air stream from the gas source. After the appropriate period of time, the gas control system can automatically restart at 1310. Restart of the gas control system can include opening the fuel line form the LP, readjusting fuel controls, reengaging the blower with the borehole or source and gradually bleeding over from the LP to methane fuel. Restart can be performed manually by an operator or automatically by the gas control system 100 manager component 132 based upon sensor data and using a series of actuators 1002. Alternatively, the sensor data can be monitored for fluctuations and a shutdown determination can be made once gas level fluctuations become less pronounced. The gas control system 100 can repeatedly shutdown and restart based upon sensor data.

Referring now to FIG. 14, a methodology 1400 for optimizing or directing a gas control system 100 is illustrated. At 1402, sensor data can be obtained from one or more sensors associated with a gas control system. Sensor data can be obtained from a variety of sensors 134 including temperature 1102, oil pressure 1108, MAP pressure 1104, methane flow, LP use or any other data related to operation of the gas control system or the conditions in which a gas control system 100 is operating.

The sensor data can be stored or maintained over time at 1404. The collected sensor data can be evaluated at 1406 and used to monitor system performance, identify trends in operation or conditions, and predict failure or maintenance requirements. In an embodiment, the sensor data can be evaluated to determine the amount of greenhouse gases destroyed by the gas control system 100 and the data used to obtain carbon credits. The sensor data can be stored locally at the gas control system 100 or provided to a coordinating manager system 1200 for storage in the coordinating data store 1208 or a remote data store 1210 for storage and aggregation.

At 1406, the sensor data can be evaluated and the current operating conditions of the gas control system 100 can be analyzed. Analysis can include identification of error conditions, suboptimal performance or other instances requiring operator attention. For example, a flag may be set when the gas control system 100 is out of LP fuel. At 1408, a determination can be made as to whether any of the conditions have been flagged for attention. If yes, at 1410 the gas control system 100 can provide notice, whether through a simple indicator light, a wireless message or sophisticated user interface.

At 1412, the gas control system 100 can be adjusted based upon the evaluation of the sensor data. Adjustments can include use automated actuators 1002 to control engine operation. If unsafe conditions are detected, adjustments can include shutdown of the gas control system 100.

It is clear to one of ordinary skill in the art that the methodology detailed in FIG. 14 is representative of the major elements of a single loop of a feedback control loop operating on a manager component 132. When used as such, upon reaching the end of the methodology 1400, the manager component 132 would begin again from the start and at 1402 once again query sensors 134 to determine the current operating state of the gas control system 100 as part of each successive feedback control loop.

Figure 15:
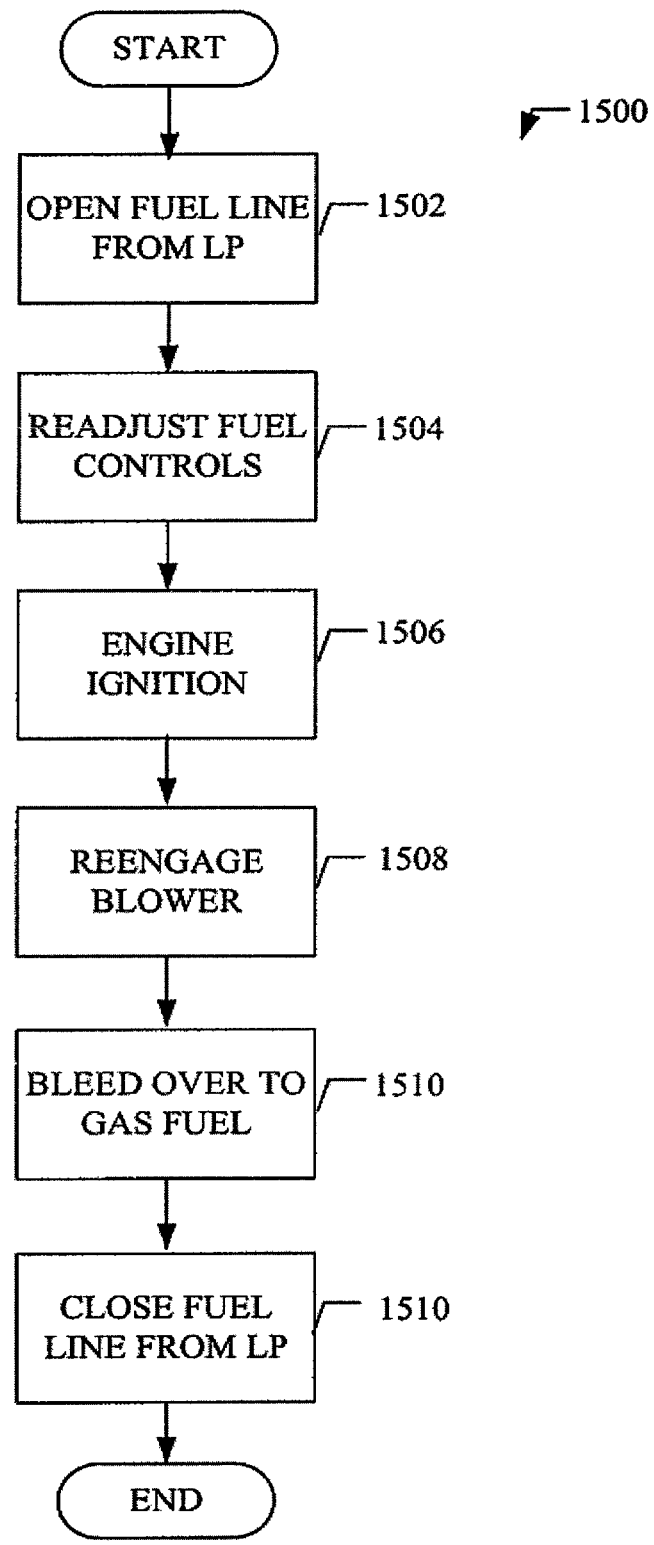
FIG. 15 illustrates steps for restart of a gas control system in accordance with an aspect of the subject matter described herein.

Referring now to FIG. 15, a methodology 1500 for restarting the gas control system 100 is illustrated. This methodology 1500 for restarting the gas control system 100 would be useful in starting up a gas control system 100 upon installation in a new borehole or alternatively at 1310 to restart the gas control system 100 after an automatic shutdown at 1306. At 1502, the LP gas regulator 904 can be reopened to allow the engine 114 to draw LP fuel. At this point, the blower 102 is likely to be disengaged to reduce load on the engine 114 during restart. Consequently, the engine 114 will require LP fuel to restart. The fuel controls, such as the special choke 130, can be readjusted for LP fuel at 1504. At 1506, the engine 114 starter is engaged and engine 114 ignition occurs allowing startup of the engine 114 as known to those of ordinary skill in the art.

Once the engine 114 is running, the blower 102 can be reengaged at 1508. The blower 102 will then begin to draw an air stream from the source, and the fuel collector 108 will begin to collect gas. At 1510, the primary fuel line 122 and the secondary fuel line 124 begin supplying gas collected from the air stream coming from the borehole and the operation of the engine 114 is adjusted using the engine control actuators 1002. At 1512, if there is sufficient gas to run the engine, the fuel line from LP can be closed and the engine controls adjusted to allow steady-state or quasi-steady state operation.

While various embodiments have been described above, it should be understood that the embodiments have been presented by way of example only, and not limitation. It will be understood by those skilled in the art that various changes in form and details may be made therein without departing from the spirit and scope of the subject matter described herein and defined in the appended claims. Thus, the breadth and scope of the present invention should not be limited by any of the above-described exemplary embodiments, but should be defined only in accordance with the following claims and their equivalents.

We claim:

1. A flammable gas control system that removes a flammable gas from a source, comprising:
   a blower that is configured to attach to a borehole that is associated with the source and includes an inlet that generates an air stream from the source through the borehole and a discharge section that expels the air stream from said blower into the atmosphere;
   a fuel collector operably connected to said discharge section of said blower that collects the flammable gas contained in the air stream from the borehole, the flammable gas comprising a greenhouse gas;
   an engine that is at least partially fueled by the flammable gas resulting in a destruction of the greenhouse gas;
   a choke configured to control the amount of air to the engine in order to establish a proper air to fuel ratio based on the amount of flammable gas contained in the airstream;

a sensor that generates a sensor data related to operating conditions of said engine, the sensor comprising a methane content sensor configured to measure the methane content of the flammable gas fueling the engine;

a manager component that records said sensor data to document the greenhouse gas destruction, the records of the manager component configured to be used to verify destruction of greenhouse gases and to provide audit trails to obtain greenhouse gas emission offsets or credits; and a heated dryer operably connected to said fuel collector that eliminates moisture from the flammable gas, the heated dryer comprising an inner section and a jacket that surrounds the inner section, wherein the borehole comprises a borehole to a mine, landfill, or dump.

2. The system of claim 1, further comprising a sensor selected from the group consisting of an air flow sensor and an engine efficiency sensor.

3. The system of claim 1, said manager component controls operation of the flammable gas control system based at least in part upon said sensor data.

4. The system of claim 3, further comprising a means for effecting operation of said engine, said means is directed by said manager component.

5. The system of claim 1, further comprising a communication component operably connected to said manager component, said communication component provides said sensor data to an remote monitoring system.

6. The system of claim 5, said remote monitoring system directs operation of the flammable gas control system via said communication component.

7. The system of claim 1, further comprising a conical funnel housed within said fuel collector that collects methane gas, said funnel is shaped such that the flow of gas through said funnel is substantially free-flowing and substantially uniformly mixed.

8. The system of claim 7, said funnel is between eight and twelve inches in length.

9. The system of claim 1, further comprising means for automatic shutdown and startup of the flammable gas control system.

10. The system of claim 1, the manager component generates an alert based at least in part on said sensor data.

11. The system of claim 1, further comprising a venturi operably connected to the heated dryer that provides for initial dehydration of the flammable gas.

12. A methane gas control system that removes a methane gas from a source, comprising:

a blower that is configured to attach to a borehole that is associated with the source and includes an inlet that generates an air stream from the source through the borehole and a discharge section that expels said air stream from said blower into the atmosphere;

a fuel collector operably connected to said discharge section of said blower that collects the methane gas contained in said air stream, the methane gas comprising a greenhouse gas;

a conical funnel housed within said fuel collector that collects methane gas, said funnel is between eight and twelve inches in length;

a heated dryer operably connected to said fuel collector that eliminates moisture from the methane gas, the heated dryer comprising an inner section and a jacket that surrounds the inner section;

a venturi operably connected to the heated dryer that provides for initial dehydration of the methane gas;

an engine that is at least partially fueled by the methane gas resulting in a destruction of the greenhouse gas;

a means for regulating atmospheric air flow to said engine that comprises a choke configured to control the amount of air to the engine in order to establish a proper air to fuel ratio based on the amount of flammable gas contained in the airstream;

a sensor that generates a sensor data related to operating conditions of said engine, the sensor comprising a methane content sensor configured to measure the methane content of the flammable gas fueling the engine; and an electronic control component that records said sensor data to determine the amount of greenhouse gas destruction, the records of the electronic control component configured to be used to verify destruction of greenhouse gases and to provide audit trails to obtain greenhouse gas emission offsets or credits, wherein the borehole comprises a borehole to a mine, landfill, or dump.

13. A method for managing removal of methane gas from a source, comprising:

drawing an air stream from a borehole that is associated with the source;

collecting the methane gas contained within said air stream to generate a collected methane gas, the methane gas comprising a greenhouse gas;

passing the collected methane gas through a heated dryer to eliminate moisture from the collected methane gas, the heated dryer comprising an inner section and a jacket that surrounds the inner section;

fueling an engine at least in part using said collected methane gas resulting in a destruction of the greenhouse gas;

controlling the amount of air to the engine with a choke in order to establish a proper air to fuel ratio based on the amount of flammable gas contained in the airstream;

obtaining a sensor data indicative of quality of the methane gas, the sensor data comprising methane content data of the methane gas fueling the engine;

recording the sensor data that includes the methane content in order to document greenhouse gas destruction, the recorded sensor data verifying destruction of greenhouse gases to provide audit trails to obtain greenhouse gas emission offsets or credits; and shutting down said engine based at least in part upon said quality of the methane gas, wherein the borehole comprises a borehole to a mine, landfill, or dump.

14. The method of claim 13, further comprising:

sampling said sensor data to obtain sampled sensor data; and comparing said sampled sensor data to a predetermined range of values, wherein said shutting down said engine is based at least in part upon outcome of said comparing.

15. The method of claim 13, further comprising:

restarting said engine;

obtaining additional sensor data; and shutting down said engine based at least in part upon said additional sensor data.

16. The method of claim 13, further comprising coordinating with a managed gas removal system located at a geographically distinct source.

17. The method of claim 13, further comprising coordinating with a managed gas removal system located at the source.

* * * * *